United States Patent [19]

Daemmer

[11] Patent Number: 4,500,970
[45] Date of Patent: Feb. 19, 1985

[54] ROBOT VEHICLE GUIDANCE SYSTEM INCLUDING CHECKPOINT REALIGNMENT SYSTEM

[75] Inventor: Johnathan E. Daemmer, Glendale, Ariz.

[73] Assignee: Richard A. Boulais, Glendale, Ariz.; a part interest

[21] Appl. No.: 339,426

[22] Filed: Jan. 15, 1982

[51] Int. Cl.³ .............................................. G06F 15/50
[52] U.S. Cl. .................................... 364/513; 180/168; 318/587; 364/444; 364/461; 364/424; 901/1
[58] Field of Search ............... 364/424, 444, 449, 460, 364/461, 436, 513, 191–193; 340/23, 24, 52 R; 318/587; 172/3; 180/167, 168, 169; 901/1

[56] References Cited

U.S. PATENT DOCUMENTS

| | | | |
|---|---|---|---|
| 3,715,572 | 2/1973 | Bennett | 364/436 X |
| 4,023,753 | 5/1977 | Dobler | 364/436 X |
| 4,119,900 | 10/1978 | Kremnitz | 318/587 |
| 4,168,760 | 9/1979 | Paul, Jr. et al. | 318/587 X |
| 4,344,498 | 8/1982 | Lindfors | 318/587 X |
| 4,379,497 | 4/1983 | Hainsworth et al. | 180/168 |

Primary Examiner—Joseph F. Ruggiero
Attorney, Agent, or Firm—Drummond & Nissle

[57] ABSTRACT

Robot vehicle guidance systems of the type which employ relative motion sensors to establish learned movement behavior along a pre-selected guidepath are improved by combining such relative motion programmed devices with apparatus for initially identifying environmental checkpoints and initially establishing the orientation of the vehicle with respect to the checkpoints. The propulsion system for the robot is responsive to both the relative motion guidance signals (for intermediate navigation between the checkpoints) and to the vehicle-checkpoint alignment information (to realign the vehicle with respect to the checkpoints). The robot vehicle is guided from the start to the finish position without reliance on a pre-selected guidepath and without compounding anomalous guidance errors induced by extraneous environmental effects.

1 Claim, 7 Drawing Figures

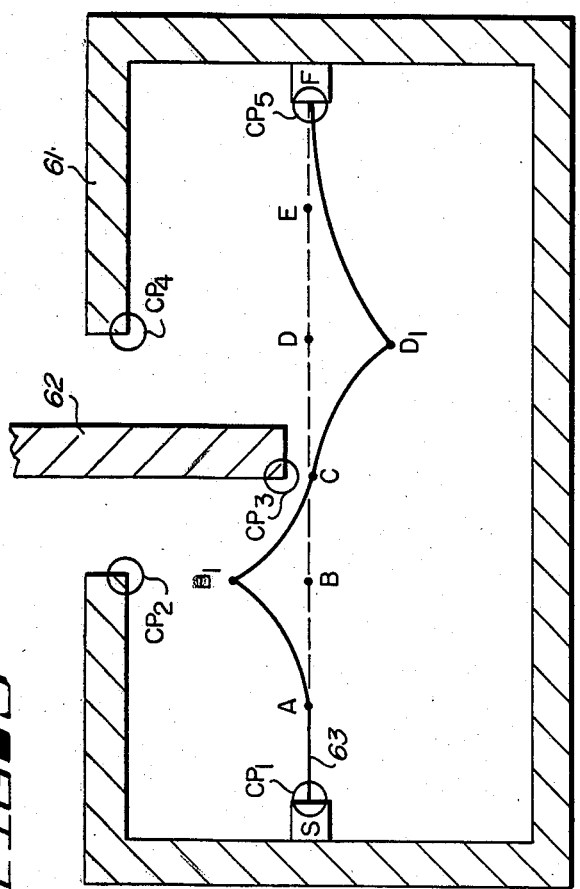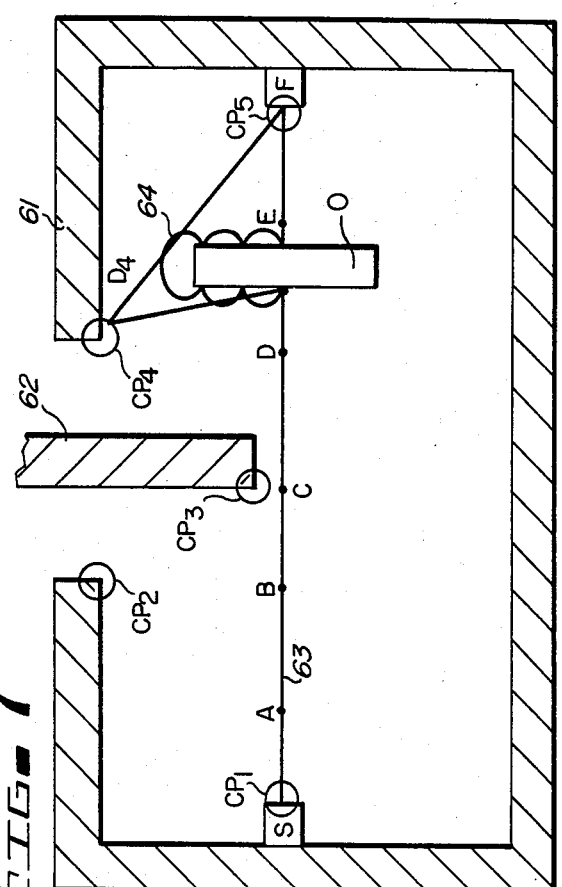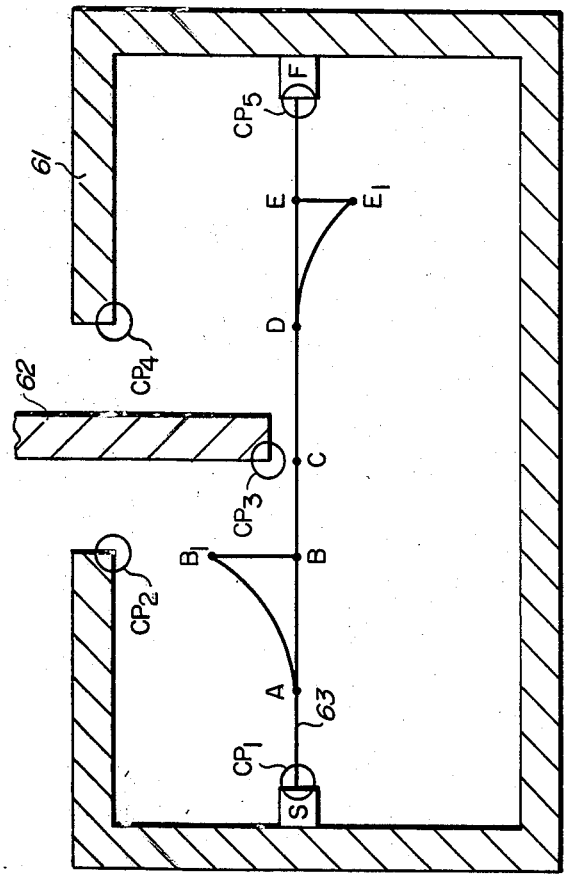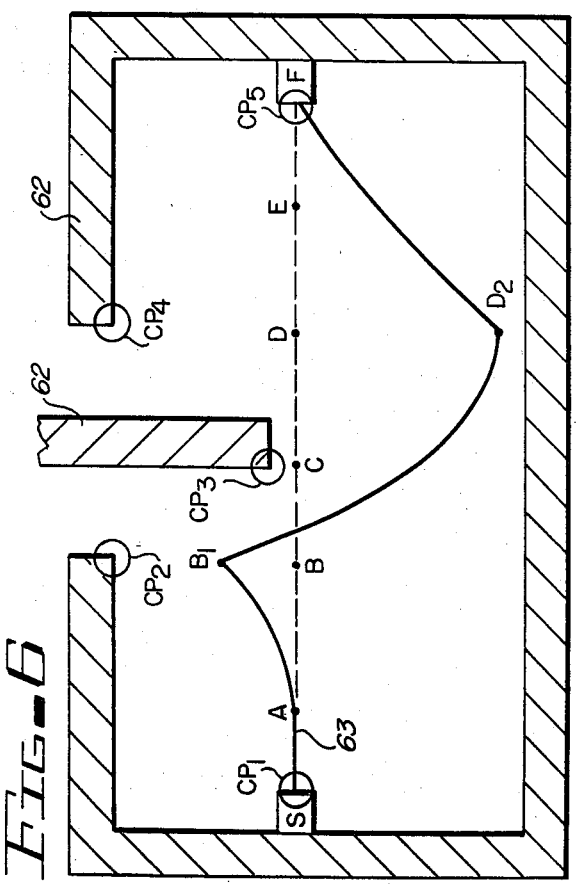

ROBOT VEHICLE GUIDANCE SYSTEM INCLUDING CHECKPOINT REALIGNMENT SYSTEM

This invention relates to an improved robot guidance system.

In another respect, the invention pertains to robot guidance systems which guide the vehicle between the start and finish positions without reliance on reproducing a pre-selected guidepath.

In yet another aspect, the invention pertains to improved robot vehicle guidance systems which do not compound anomalous guidance errors induced by extraneous environmental effects.

Robot vehicles which operate without continuous control by human operators are well known. For example, many types of guided robot vehicles have been proposed for a wide variety of end-use applications such as, for example, delivery of stored raw materials and sub-component parts to manufacturing and assembly facilities, performance of a wide variety of agriculturally related tasks such as plowing, harvesting, mowing, etc., and in the operation of various types of military equipment and the like. Similar technology is also used in conventional graphic plotters, numerical control machines and manufacturing robots.

According to conventional prior art techniques, such robot-guided vehicles and machines conventionally employ some means of encoding a memory device with signals which represent the relative motion of the apparatus with respect to its environment. For example, the relative motion information can be stored in the form of data which represent the forward, backward and transverse movement of the vehicle in various increments along a pre-selected guidepath. In certain applications, such prior art technology has been effectively employed, but in many other applications, notably in instances in which the robot vehicle is subject to anomalous guidance errors as a result of extraneous environmental conditions, the prior art systems have not proven effective, either because of blockage of the pre-selected guidepath or effects such as wheel slippage and the like induced by differences in the composition or consistency of the terrain over which the vehicle is required to move. If there is no compensation for extraneous effects, the typical relative motion-type system will err in guiding the robot vehicle and this error will be compounded as the vehicle moves along its pre-selected path. Additionally, even if the vehicle moves accurately along a pre-selected path, difficulties may be encountered if this path is blocked or obstructed after the guidance system is initially programmed.

The closest prior art of which I am aware is U.S. Pat. No. 3,715,572, issued Feb. 6, 1973 to Dale E. Bennett. According to the system provided by Bennett, pulses generated by the rotation of the wheels or tracks of a vehicle are processed to provide representations of the heading and location of the vehicle relative to X and Y coordinate axes. These stored representations are processed by apparatus which provides for operation of the vehicle over a predetermined course. According to one embodiment, mid-course corrections are made by comparing the actual numbers of pulses generated by movement of the wheels over the terrain to the pre-selected desired numbers of pulses and making appropriate changes in the signals provided to the propulsion system until the compared values are the same and the vehicle has returned to the pre-selected guidepath.

Therefore, it would be highly advantageous to provide an improved robot vehicle guidance system which minimizes the anomalous guidance errors induced by extraneous environmental effects.

It would also be highly advantageous to provide an improved robot vehicle guidance system in which the vehicle is not constrained to move along a pre-selected guidepath between the start and the finish positions.

It is, therefore, a principal object of the present invention to provide an improved guidance system for a robot vehicle.

Yet another object of the invention is to provide such an improved guidance system which compensates for anomalous guidance errors induced by extraneous environmental effects.

Still another object of the invention is to provide an improved guidance system for robot vehicles which enables the vehicle to move from the start to the finish position without the constraint of following a pre-selected guidepath.

These and other, further and more specific objects and advantages of the invention will be apparent to those skilled in the art from the following detailed description thereof, taken in conjunction with the drawings, in which.

Figure 1:
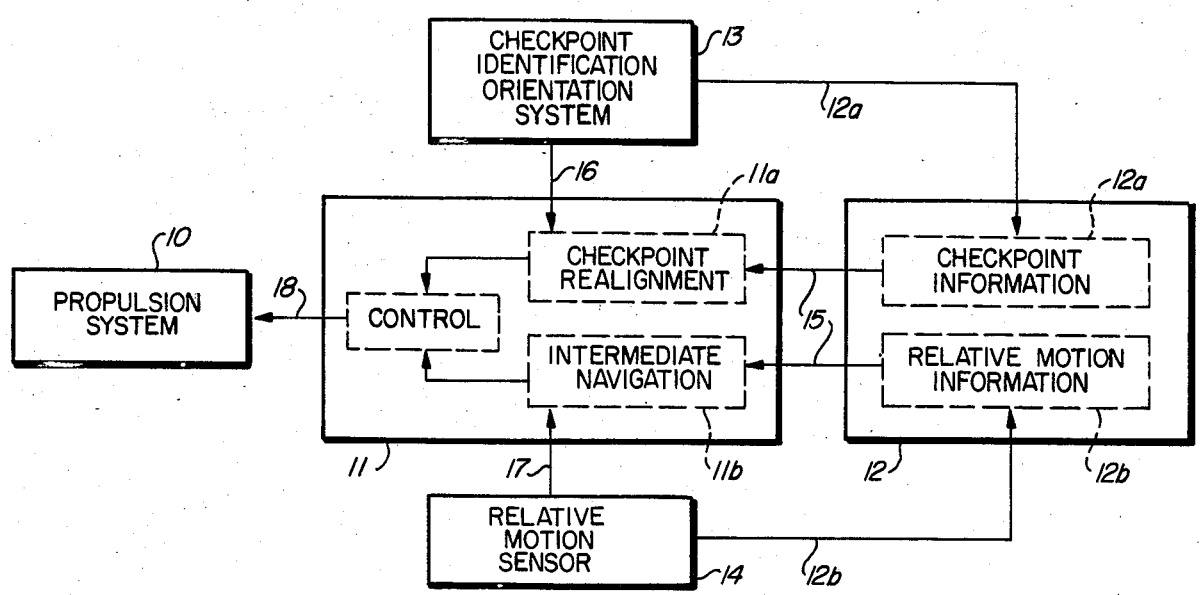
FIG. 1 is a block diagram illustrating an improved robot vehicle guidance system embodying the present invention.

FIGS. 4-6 schematically illustrate the operation of the improved guidance system of the present invention by reference to the movement of a robot vehicle through a simple maze; and FIG. 7 schematically illustrates the operation of the improved guidance system of the present invention by reference to the movement of a robot vehicle through a simple maze in which the pre-selected guidepath is obstructed after the initial learned behavior is established.

Briefly, in accordance with the invention, I provide an improved guidance system for robot vehicles. The improvements which are provided by the present invention are combined with typical relative motion guidance systems of the prior art, which generally include means for initially detecting the relative motion of a vehicle with respect to its environment along a pre-selected guidepath between a start position and a finish position. The relative motion detected by the sensor is converted to signals which represent learned behavior in the form of intial vehicle-guidepath relative motion information. This initial information is stored in a memory and is later recalled and converted to vehicle guidance signals which are applied to the propulsion system of the vehicle to cause the vehicle to repeat the learned behavior embodied in the stored initial relative motion information.

In combination with such relative motion guidance systems, I provide improvements which enable the vehicle to move from the start position to the finish position without reliance on following a pre-selected guidepath and without compounding anomalous guidance errors induced by extraneous environmental effects. These improvements comprise, in combination with the prior art relative motion guidance systems, means for initially identifying environmental checkpoints and locating each of these checkpoints in relation to at least certain others and for initially establishing the orientation of the vehicle with respect to said checkpoints. Means are provided for storing the initial checkpoint and orientation information and for recalling this information in later operation of the vehicle with this environment. Means are also provided to sense the actual orientation of the vehicle with respect to the checkpoints during these later operations and for comparing the actual orientation information with the recalled orientation information and generating vehicle-checkpoint realignment signals. The propulsion means for the robot vehicle is responsive to both the relative motion guidance signals (for intermediate navigation of the vehicle between the checkpoints) and the vehicle-checkpoint realignment signals (to realign the vehicle with respect to said checkpoints to the initial alignment).

The combination of these prior art and novel guidance systems guides the vehicle from the start position to the finish position even though guidance anomalies are induced by extraneous environmental effects and even though the vehicle's path is blocked or obstructed.

Turning now to the drawings, FIG. 1 is a block diagram which illustrates a preferred embodiment of the improved guidance system of the present invention, the main components of which are a propulsion system 10, a propulsion system controller 11 and a memory 12. A checkpoint identification-orientation sensor 13 and a relative motion sensor 14 are provided.

As indicated by the dashed lines, the controller performs the dual function of checkpoint realignment 11a and intermediate navigation 11b. The memory contains both checkpoint information 12a and relative motion information 12b which is initially furnished by the checkpoint orientation-identification sensor 13 and the relative motion sensor 14. After the checkpoint information 12a and relative motion information 12b are stored in the memory 12, during subsequent operational cycles this information can be recalled from the memory 12 and the recalled information 15 is fed to the controller 11, compared with inputs 16 and 17 from the checkpoint orientation sensor 13 and the relative motion sensor 14. The controller 11 generates control signals 18 which are fed to the propulsion system 10 to provide checkpoint realignment and intermediate navigation for the robot.

The propulsion system 10 can be any suitable system for guiding the robot in response to the control signals 18. For example, standard stepper motors can be used to drive wheels or endless tracks which move the robot in accordance with the control signals 18.

The memory 12 can be any suitable prior art memory unit such as are commonly used in numerical control machines, industrial robots, etc. For example, electromagnetic memories such as magnetic, optical, solid state, etc. or mechanical memories such as paper tape. The relative motion information 12b stored in the memory 12 can be a series of fixed increment movement data or, alternatively, information concerning the geometry of the environment for executing intermediate navigation routines 11b. This relative motion information is interspersed with checkpoint information 12a for executing realignment routines 11a in the controller 11.

Figure 2:
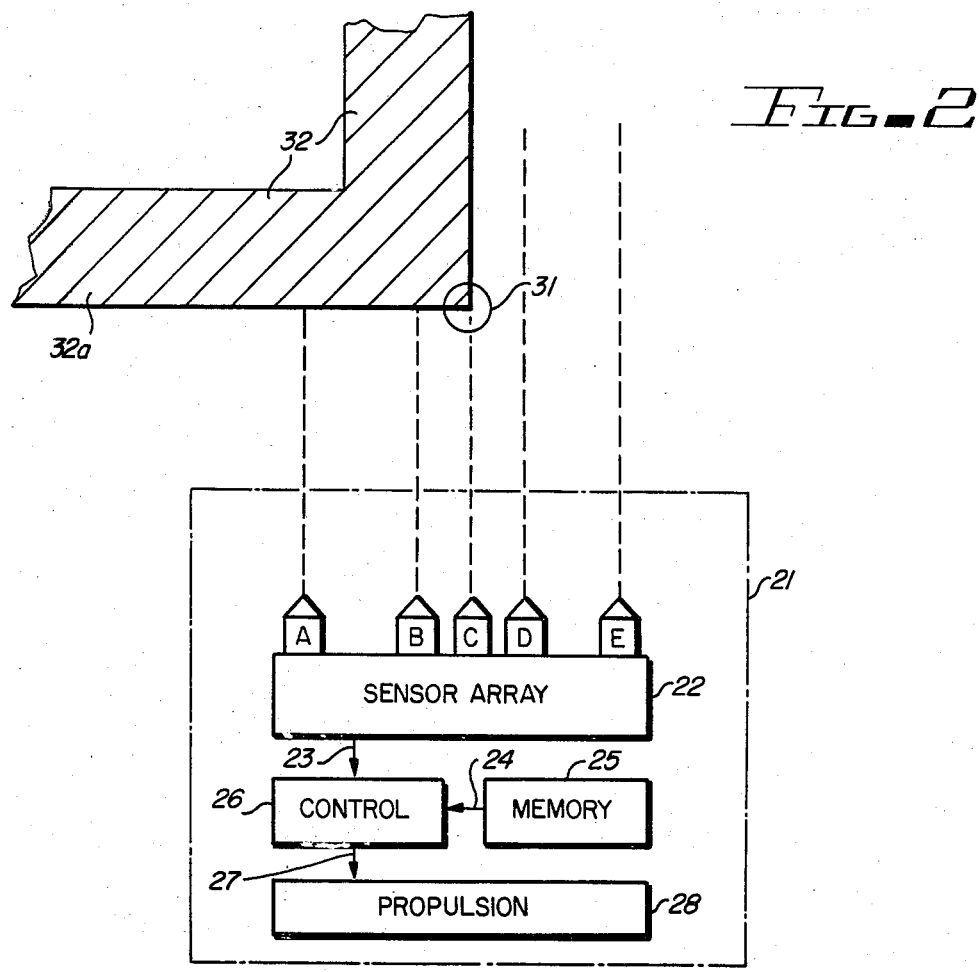
FIG. 2 illustrates a vehicle-orientation checkpoint sensor which is employed in the presently preferred embodiment of the invention.

An orientation sensor which can be employed in accordance with the presently preferred embodiment of the invention is illustrated schematically in FIG. 2. The robot vehicle 21 carries a sensor array 22, the output 23 of which, along with information 24 recalled from the memory 25, is processed in the controller 26 to provide command signals 27 to the propulsion system 28 of the vehicle 21. The sensor array can be a series of mechanically operated electrical switches, ultrasound range detectors or any other suitable sensor which detects the proximity of a selected checkpoint. In the illustration shown in FIG. 2, the chosen checkpoint is the corner 31 formed by the junction of walls 32. The sensor array 22 carries individual proximity detectors A, B, C, D and E which detect the proximity of the wall 32a.

If the notation A is adopted to indicate that proximity is detected on a particular sensor, $\overline{A}$ is used to indicate that proximity is not detected by a particular sensor and P is adopted to mean that the sensor array is within a pre-selected proximity of the checkpoint, then P = proximity to any of the detectors
Parallel = equal proximity to any two or more detectors, e.g., A + B
Right of target = $P + \overline{C}$
Left of target = P + D
Orientation correct = $P + C + \overline{D}$ The realignment tolerance is dependent on the geometry of and spacing of the proximity detectors A-D. The checkpoint spacing is determined by the alignment tolerance and the accuracy of movement of the robot vehicle. The detector-to-wall distance should be such that all detector outputs are valid.

Figure 3:
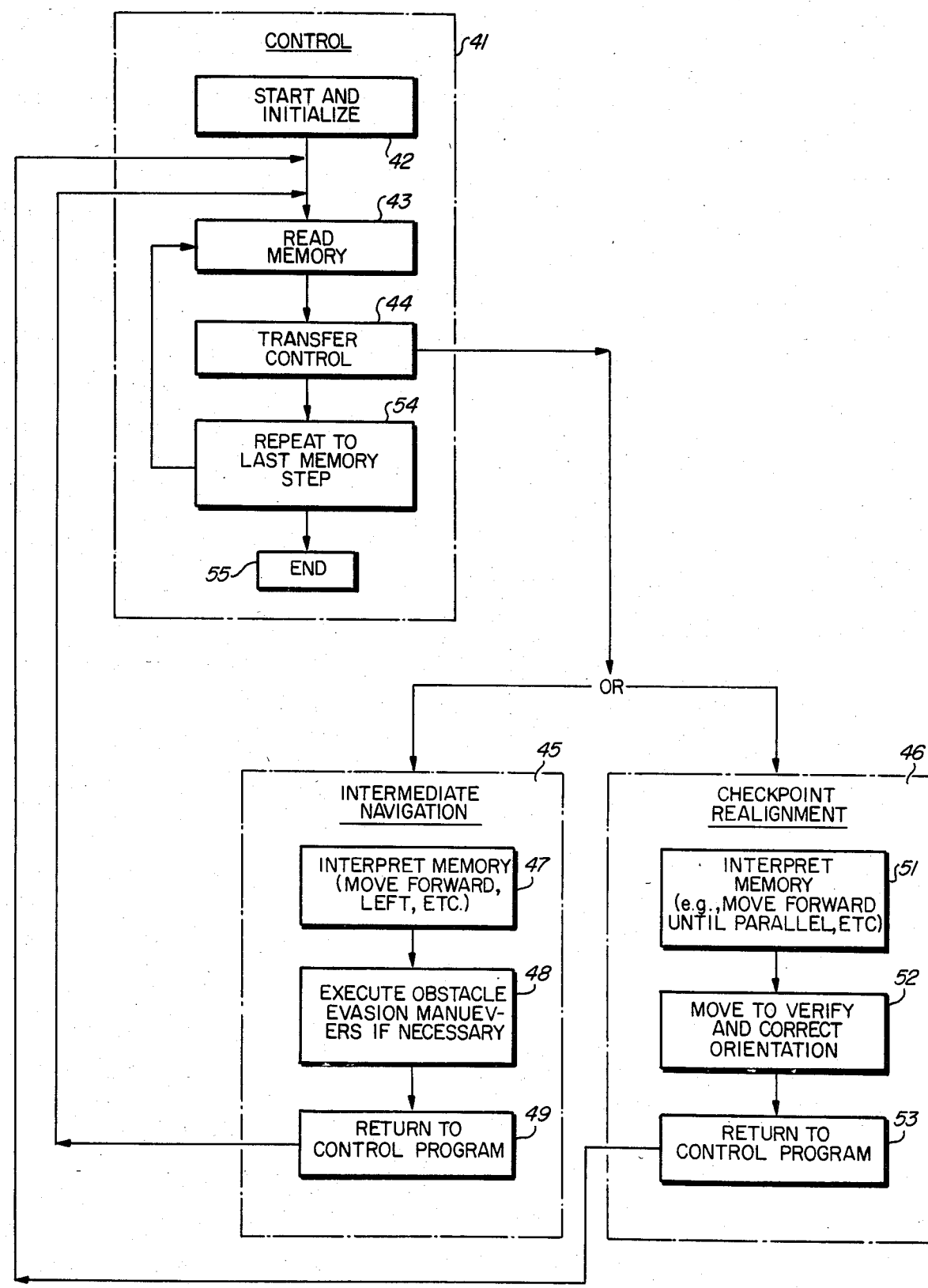
FIG. 3 is a block diagram which illustrates a typical program or logic function utilized in accordance with the presently preferred embodiment of the invention.

FIG. 3 is a block flow diagram which illustrates a typical program or logic function which is executed by the controller for fixed increment movement of the robot vehicle with checkpoint realignment between each increment. The basic control program 41 consists of commands to "start and initialize" 42, "read memory" 43 and "transfer control" 44 to either the intermediate navigation sub-routine 45 or the checkpoint realignment routine 46.

The intermediate navigation sub-routine 45 consists of commands to "interpret memory" 47 (i.e., move forward, left, etc. a pre-selected distance) and "return to program control" 48. An optional "execute obstacle evasion maneuvers" 49 may be provided, if desired. The checkpoint realignment sub-routine 46 includes an "interpret memory" step 51 (e.g., move forward until parallel to wall or other checkpoint) followed by "move to correct orientation" 52 (i.e., right, left or a particular angular orientation to the checkpoint) followed by "return to control program" 53. The control program 41 and the intermediate navigation 45 and checkpoint realignment 46 sub-routines are repeated as indicated by the "repeat to last memory step" 54 of the control program 41 followed by an "end" program step 55 which completes the execution of the program.

The operation of the robot vehicle guidance system of FIGS. 1-3 is illustrated in FIGS. 4-7. In each of FIGS. 4-7, it is assumed that it is desired to move a robot vehicle from a starting point S to a finish point F through a simple maze formed by the walls 61 and 62.

As shown in FIG. 4, the pre-selected guidepath is a straight line 63 (S-F). Checkpoints $CP_1$, $CP_2$, $CP_3$, $CP_4$ and $CP_5$ are indicated by the open circles. The robot vehicle is programmed to move along the pre-selected guidepath 63 and, at the end of pre-selected increments S-A, A-B, B-C, C-D, D-E and E-F, during which the vehicle is guided by the intermediate navigation function of the controller, the vehicle guidance system checks the position and alignment of the vehicle with respect to proximate checkpoints and, if necessary, commands the propulsion system to realign the vehicle in accordance with the initial realignment information stored in the memory. As shown in FIG. 4, it is assumed that the vehicle moves along the correct guidepath (S-A-B-C-D-E-F) to point A and that some extraneous effect causes the vehicle to stray from the preselected guidepath along line A-$B_1$ under control of the intermediate navigation sub-routine. At point $B_1$, the checkpoint realignment sub-routine is executed and, sensing that the vehicle is too close to checkpoint $CP_2$, the control system causes the vehicle to move along the line $B_1$-B to return the vehicle to the pre-selected guidepath. The vehicle then moves B-C under intermediate navigation control, senses its correct alignment at point C with checkpoint $CP_3$ and continues under intermediate navigation control along C-D. However, if the vehicle again strays from the pre-selected guidepath and instead moves along line D-$E_1$ under intermediate navigation control, it will sense at point $E_1$ that it has again strayed from the guidepath and the guidance system will return the vehicle along line $E_1$-E to the guidepath. At point E, the checkpoint realignment sub-routine is completed by realigning the vehicle with respect to checkpoint $CP_5$ and the vehicle then moves along the segment E-F to the finish position.

An optional variation of the operation shown in FIG. 4 is depicted in FIG. 5, in which the vehicle at point $B_1$ does not move directly back to the guidepath along line $B_1$-B but gradually moves back to the guidepath along line $B_1$-C to assume its proper orientation at point C with checkpoint $CP_3$. If, for some reason, the vehicle then strays again from the pre-selected guidepath along line C-$D_1$, its course can be gradually altered by the control logic to return to the end point F (checkpoint $CP_5$) along line $D_1$-F.

Another possible variation of the movement of the vehicle under the guidance system of the present invention is illustrated in FIG. 6. If, instead of returning to the guidepath as shown in FIGS. 4-5, the vehicle erroneously moves along the line $B_1$-$D_2$, the guidance system can cause the vehicle to ultimately reach the finish point F ($CP_5$) by movement along $D_2$-F.

Another special capability of the guidance system of the present invention is illustrated by FIG. 7, in which an obstacle O is placed along the pre-selected guidepath S-F. The vehicle moves along the pre-selected guidepath past point D and encounters obstruction O. At this point, the vehicle can be programmed to execute a variety of evasion maneuvers. For example, a series of circular movements 64 can be repetitively executed until the vehicle returns to the guidepath S-F and is correctly aligned at E with checkpoint $CP_5$. Alternatively, the guidance system could be programmed to cause the vehicle to move directly towards $CP_4$ to point $D_3$ and then in the direct line $D_3$-$CP_5$ to the finish position F.

Having described my invention and the presently preferred embodiments thereof in such terms as to enable those skilled in the art to understand and practice it, I claim:

1. In a guidance system for a robot vehicle, including
    relative motion sensor means for initially detecting the relative motion of said vehicle with respect to its environment along a pre-selected guidepath between a start position and a finish position and for generating signals representing learned behavior in the form of initial vehicle-guidepath relative motion information,
    memory means for storing said initial relative motion information,
    means for recalling said initial relative motion information and converting said information to vehicle guidance signals,
    propulsion means responsive to said guidance signals, to cause said vehicle to repeat the learned behavior embodied in said stored initial vehicle-guidepath relative motion information,
    the improvements in said guidance system which enable said robot to move from the start position to the finish position without reliance on a pre-selected guidepath therebetween and without compounding anomalous guidance errors induced by extraneous environmental effects, said improvements comprising, in combination with said guidance system:
    (a) means for initially identifying environmental checkpoints and locating each of these checkpoints in relation to at least certain other environmental checkpoints and for initially establishing the orientation of said vehicle with respect to said checkpoints;
    (b) means for storing said initial vehicle-checkpoint orientation information;
    (c) means for recalling said initial vehicle-checkpoint orientation information in later operations of the vehicle within said environment;
    (d) means for sensing actual vehicle-checkpoint orientation during said later operations and for comparing said actual orientation information with said recalled orientation information and generating vehicle-checkpoint realignment signals; and
    (e) propulsion means responsive to
        (i) said relative motion guidance signals for intermediate navigation of said vehicle between said checkpoints, and
        (ii) said vehicle-checkpoint realignment signals to realign said vehicle with respect to said checkpoints to said initial alignment,
    to guide said vehicle from said start position to said finish position.

* * * * *